United States Patent [19]

Goto et al.

[11] Patent Number: 5,276,292
[45] Date of Patent: Jan. 4, 1994

[54] OPERATION CHECK DEVICE OF DYNAMIC BRAKE CIRCUIT FOR ELEVATOR

[75] Inventors: Michio Goto, Yokohama; Yoshikazu Ishijima, Nagoya, both of Japan

[73] Assignee: Otis Elevator Company, Farmington, Conn.

[21] Appl. No.: 740,830

[22] Filed: Aug. 6, 1991

[30] Foreign Application Priority Data

Aug. 13, 1990 [JP] Japan ................... 2-214023

[51] Int. Cl.$^5$ ............. B66B 1/24; H02P 3/18
[52] U.S. Cl. ................. 187/108; 318/759; 187/109
[58] Field of Search ........... 187/108, 109, 112, 115; 318/757, 759, 760, 761, 762, 763, 764, 375, 376

[56] References Cited

U.S. PATENT DOCUMENTS

| | | | |
|---|---|---|---|
| 4,039,914 | 8/1977 | Stiegerwald et al. | 318/375 |
| 4,503,940 | 3/1985 | Watanabe | 187/108 |
| 4,545,464 | 10/1985 | Nomura | 187/108 |
| 4,663,578 | 5/1987 | Iwasaki | 318/762 |
| 4,667,776 | 5/1987 | Nomura | 187/105 |
| 4,678,980 | 7/1987 | Sugimoto et al. | 318/759 |
| 4,733,146 | 3/1988 | Hamby | 318/393 |
| 4,749,932 | 6/1988 | Yonemoto | 318/759 |
| 4,787,021 | 11/1988 | Hokari et al. | 363/37 |
| 4,902,954 | 2/1990 | Oshima et al. | 318/762 |
| 5,070,290 | 12/1991 | Iwasa et al. | 318/758 |

FOREIGN PATENT DOCUMENTS 62-27786 2/1987 Japan .

*Primary Examiner*—Steven L. Stephan
*Assistant Examiner*—Thomas M. Dougherty

[57] ABSTRACT

In this invention, a provision is made for a means for detecting the voltage or current of a dynamic brake regenerative (DBR) circuit for determining whether the DBR circuit is properly functioning in an elevator system in which a DBR circuit for controlling the regenerative electrical power is connected between the input terminals of an inverter working as an electrical power source for an alternating current electric motor for driving an elevator car, so that the operation of the DBR circuit is automatically checked immediately before operating an elevator, preventing the occurrence of an abnormal situation caused by unabsorbed regenerative electrical power.

1 Claim, 2 Drawing Sheets

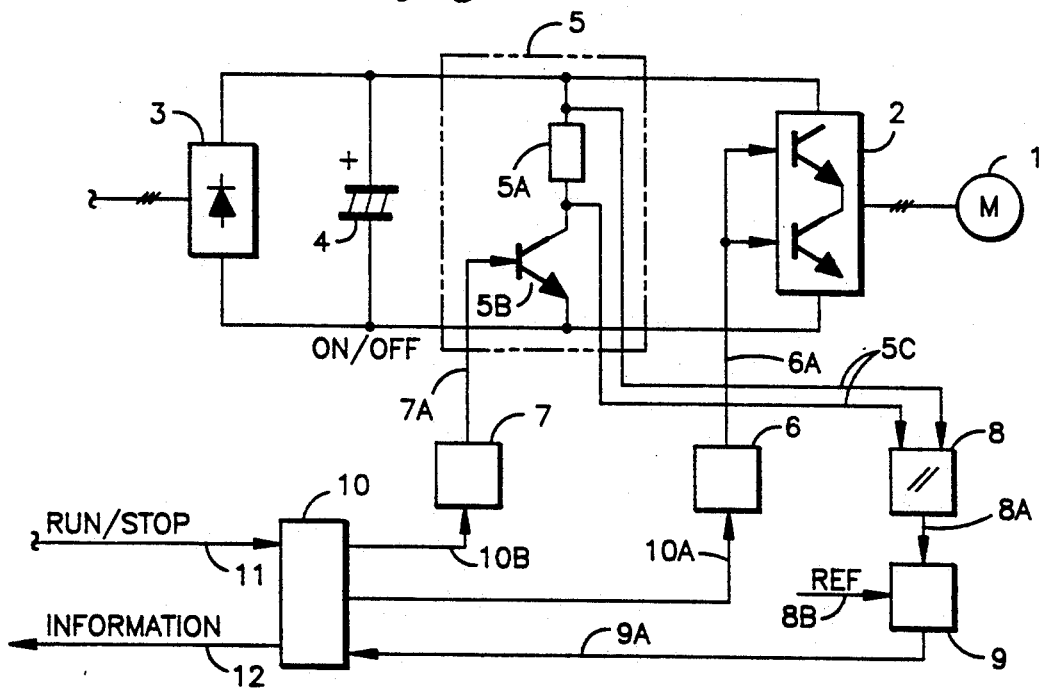
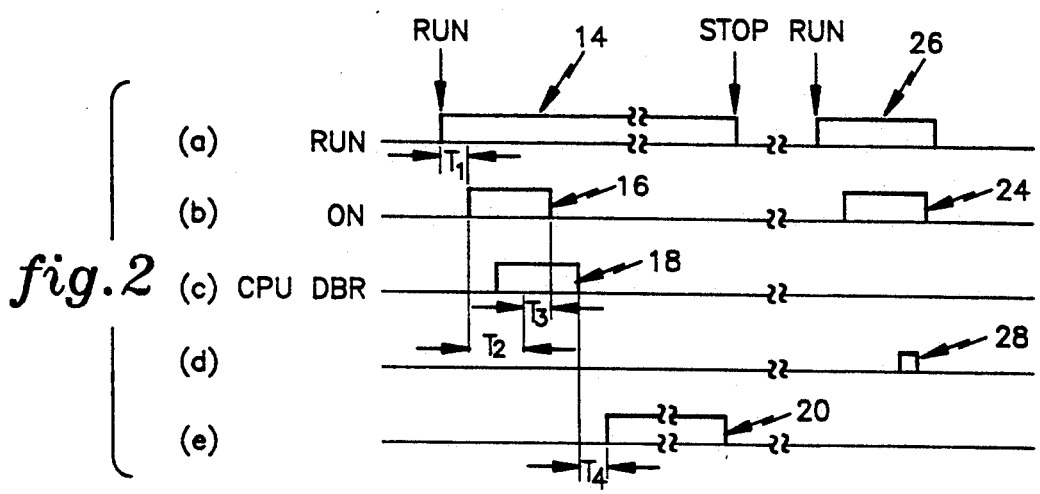

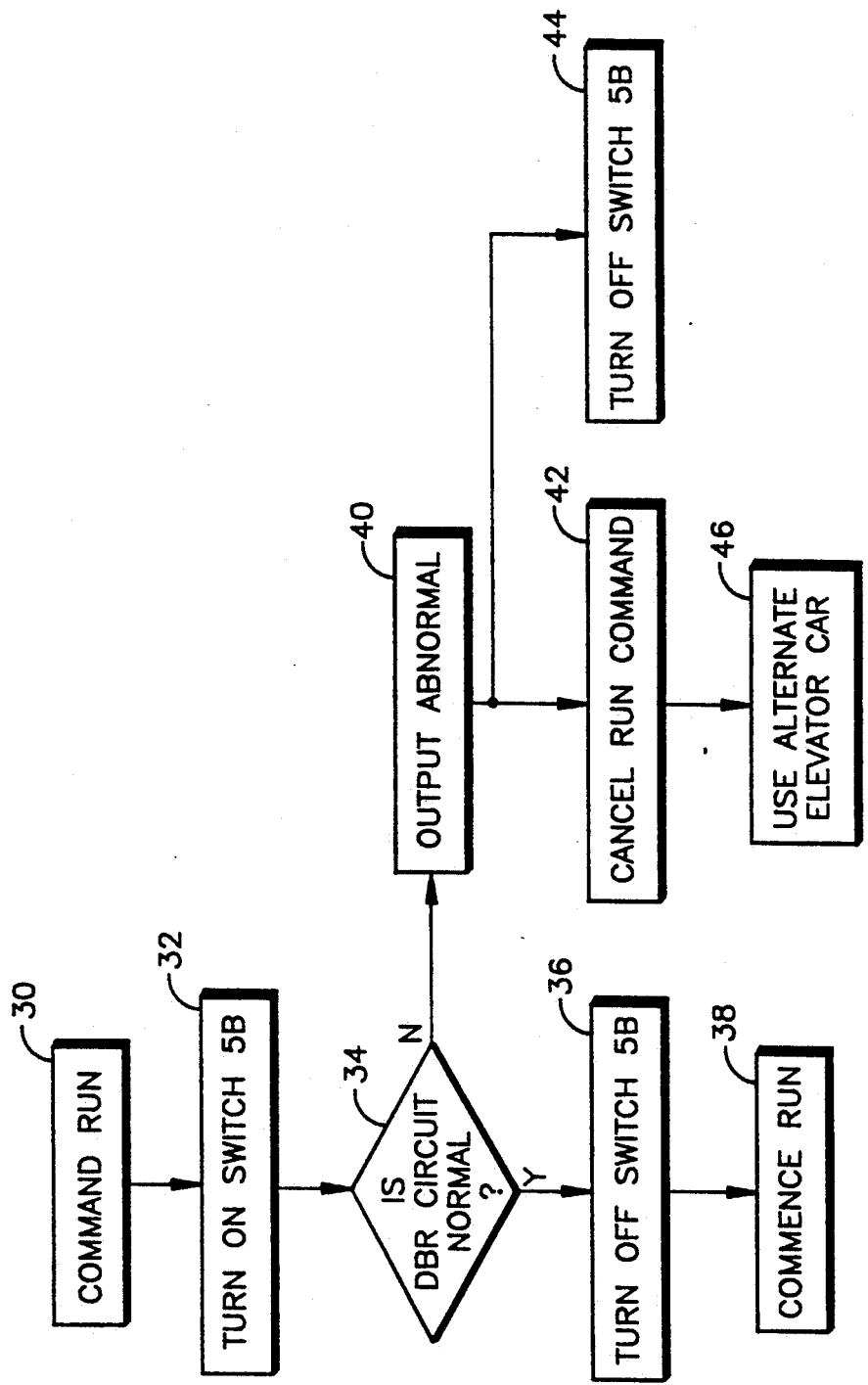

OPERATION CHECK DEVICE OF DYNAMIC BRAKE CIRCUIT FOR ELEVATOR

TECHNICAL FIELD

This invention is related to an operation checkup device for an elevator dynamic brake regeneration (DBR) circuit which checks the operation of a DBR circuit used for controlling regenerative electrical power during elevator operation.

BACKGROUND ART

In an elevator system, a regenerative condition may arise between the beginning and the end of an operation when the elevator car is operated up or down. If this regenerative electrical power is not controlled, an overvoltage occurs, stopping the device, and therefore measures for controlling this regenerative electrical power are taken. One of those measures is a DBR circuit.

In this circuit, a series circuit consisting of a resistor and a switching element (for example, a transistor) is connected between the input terminals of an inverter device working as an electrical power source for driving an elevator car, and the regenerative electrical power is consumed by means of the ON/OFF control of the switching element to prevent the overvoltage.

DISCLOSURE OF THE INVENTION

Since a DBR circuit does not operate in the driving condition, elevator operation is possible even if there is trouble in the DBR circuit. Because of this, if an elevator is operated when there is trouble in the DBR circuit, an overvoltage condition occurs while the operation is in the regenerative cycle condition, which invites an elevator stall condition, in other words, a condition in which the elevator car stops between the floors and the passengers are trapped inside.

According to the present invention, an operation checkup device for an elevator DBR circuit is provided by which the DBR circuit operation can be automatically checked beforehand, preventing an emergency situation such as one in which the continuation of elevator operation is impossible.

In further accord with the present invention, provision is made for a detection section which detects the voltage or current of a DBR circuit connected between the input terminals of an inverter working as an electrical power source for an alternating current electric motor for driving an elevator car, a comparator which compares the detected output of this detection section with a predetermined standard value, and a process/control section which receives an operating command to control a DBR driver and an inverter driver, and which also determines before starting the operation whether the above-mentioned DBR circuit is properly functioning based on the comparison results of the above-mentioned comparator and takes appropriate measures in response to the result of said determination.

Following the reception of an operating command, an operating signal is given to the DBR circuit after a given period.

If the DBR is functioning normally, its voltage or current is detected and compared with the standard value. If this comparison result is confirmed within a given period, the output of the operation signal to the DBR circuit is stopped and a normal inverter operation is started afterward.

On the other hand, if the comparator operation is not confirmed within a given period, trouble is determined to be in the DBR circuit, and measures are taken to stop the output of the operation signal and nullify the reception of the operating command, and predetermined information is also output.

These and other objects, features and advantages of the present invention will become more apparent in light of the following detailed description of a best mode embodiment thereof, as illustrated in the accompanying drawing.

BRIEF DESCRIPTION OF THE DRAWING

FIG. 1 is a circuit diagram which shows an apparatus embodiment according to the present invention for checking the operation of an elevator DBR circuit;

FIG. 2 is a timing chart for explaining the operation of the same application example; and FIG. 3 is a flow chart of the checkup process of the operation of the same application example.

BEST MODE FOR CARRYING OUT THE INVENTION

FIG. 1 includes an apparatus embodiment according to the present invention. An alternating current electric motor 1 for driving a car is itself driven by an inverter 2 connected to a pair of output terminals of a converter 3. A smoothing capacitor 4 is connected between the output terminals of the converter 3 which terminals are, as mentioned, also connected to the inverter 2. The interconnection of the converter and inverter may herein be referred to as a DC link. A DBR circuit 5 is connected across the DC link, in other words, connected in parallel with the capacitor 4. The DBR circuit 5 is constructed by means of connecting a resistor 5A and a switching transistor 5B in series.

A driver 6 supplies the above-mentioned inverter 2 with a plurality of gate signals represented by a line 6A for switching the DC input from the link into AC for driving the motor 1. The above-mentioned DBR transistor 5B is provided with an ON/OFF signal on a line 7A by a DBR drive circuit 7. An insulated amplifier 8 detects the voltage across the above-mentioned resistor 5A and provides a sensed signal on a pair of lines 5C. The amplifier 8 provides a signal on a line 8A to a comparator 9 which compares the output voltage of this insulated amplifier 8 with a reference signal on a line 8B having a selected magnitude and provides a signal on a line 9A having a magnitude indicative of the result of the comparison. A signal processor 10, which may include a central processing unit (CPU), provides a control signal on a line 10A to the driver 6 and a control signal on a line 10B to the driver 7 in response to a RUN/STOP signal on a line 11. The signal processor 10 determines whether the DBR circuit 5 is properly functioning based on the comparison results from the above-mentioned comparator 9 and outputs an instruction signal on a line 12 containing information indicative of an abnormal condition in the circuit 5.

For an operational example, reference is made to the timing chart of FIG. 2 which shows various waveforms with reference to a common timeline. First, as shown in FIG. 2(a), when the operating signal (RUN signal) on the line 11 is provided to the processor 10, as shown by a waveform 14, the signal on the line 10B causes an ON signal, as shown by a waveform 16 in FIG. 2(b), to be provided on the line 7A to the transistor 5B from DBR driver 7 after a time period $T_1$ elapses after initiation of the RUN signal as shown in FIG. 2(a).

When DBR circuit 5 is normal, voltage is generated across the terminals of resistor 5A following the turn on of transistor 5B. This voltage is detected by insulated amplifier 8 and is compared with the reference signal magnitude by the comparator 9. In this case, the magnitude of the detected voltage is larger than the reference magnitude, and the output level of comparator 9 becomes, for example, a high level as shown by a waveform 18 in FIG. 2(c). If this operation of the comparator 9 is signaled on the line 9A to the ocessor 10 within a time period $T_2$ after the transistor 5B is turned on, the transistor signal output on line 5B, is stopped after a time period $T_3$ from that point of time, as indicated by the waveform 16, and a normal inverter operation is started, as indicated by a waveform 20 in FIG. 2(e) after a time period $T_4$ elapses after the comparator 9 returns to its previous state.

Using the same timeline for a second, but abnormal example, later in time (illustrated as after a break), if there is no change in the output level of comparator 9 within the time period ($T_2$) after the transistor (ON) signal output, as indicated by a waveform 24 in FIG. 2(b), an abnormality is determined to be in DBR circuit 5, the transistor (ON) signal output is stopped after time ($T_3$), as before, and also, the RUN signal on the line 11, as indicated by a waveform 26, is nullified in response to a signal on line 12, represented by a waveform 28 in FIG. 2(d) informing of the abnormality. As a result of this, when the DBR circuit 5 is having trouble, the use of this elevator may be prevented, therefore preventing the occurrence of an abnormal situation such as one in which the elevator stops between the floors and the passengers are trapped inside.

It should be realized that although the voltage across the terminals of the resistor 5A of DBR circuit 5 was detected in the above-mentioned application example, another physical quantity, such as current, temperature or lack thereof, etc., by which the DBR circuit operation can be checked, may be detected as well.

The flow chart of FIG. 3 begins with a step 30 in which an indication of the issuance of a run/stop command signal is provided on the line 11 of FIG. 1. After step 30, a step 32 is executed in which the switch 5B is turned on and current flows through the resistor 5A if the circuit is intact. A step 34 determines if the DBR circuit 5 is normal and, if so, a step 36 is executed in which step 5B is shut off. A run is then committed to commence as indicated in a step 38 as signaled by the signal on the line 12 of FIG. 1 or the lack of such signal.

If step 34 determines that the DBR circuit is not normal, the signal on line 12 provides an indication of an abnormal condition as indicated in a step 40. The run command would then be cancelled as indicated in a step 42 and switch 5B is turned off as indicated in a step 44. A step 46 indicates that an alternate elevator car or some other appropriate measure is taken in response to the abnormal condition.

A flow chart illustrative of the above-mentioned operation checkup process is shown in FIG. 3.

As explained above, according to this invention, since a provision is made in which an operation check is automatically performed immediately before operating an elevator by a means for detecting the voltage or such of a DBR circuit to determine whether its operation is normal, it becomes possible to prevent elevator usage when the DBR circuit is having trouble, preventing the occurrence of an emergency such as one in which an elevator stops between the floors and the passengers are trapped inside because of an overvoltage during a regenerating operation.

Although the invention has been shown and described with respect to a best mode embodiment thereof, it should be understood by those skilled in the art that the foregoing and various other changes, omissions, and additions in the form and detail thereof may be made therein without departing from the spirit and scope of the invention.

We claim:

1. Apparatus for an elevator having a dynamic brake regeneration (DBR) circuit for absorbing regenerative power from an inverter, comprising:

detection means, responsive to the voltage or current of a regenerative power absorbing device, for providing a sensed signal having a magnitude indicative of said power;

a comparator, responsive to the sensed signal and to a reference signal having a selected magnitude, for comparing the magnitudes of the sensed signal and the reference signal, for providing a normality signal having a magnitude indicative of a normal or abnormal condition in the DBR circuit; and signal processing means responsive to a run/stop signal for controlling said inverter such that when said normality signal indicated an abnormal condition of said DBR circuit, said inverter is not operated.

* * * * *